United States Patent [19]

Lynch et al.

[11] Patent Number: 4,597,488

[45] Date of Patent: Jul. 1, 1986

[54] PHASE CONTROLLED APPARATUS FOR A PROCESSING OPERATION

[75] Inventors: Joseph A. Lynch, Hillsdale; Daniel Ignatuk, Morris Plains, both of N.J.

[73] Assignee: Nabisco Brands, Inc., Parsippany, N.J.

[21] Appl. No.: 449,454

[22] Filed: Dec. 13, 1982

[51] Int. Cl.$^4$ .............................................. B65G 47/00
[52] U.S. Cl. .................... 198/339.1; 74/815;
74/401; 29/434; 29/700; 29/822
[58] Field of Search .................. 198/339, 576, 345;
99/450.4; 74/815, 401; 29/434, 709, 700, 714, 713, 822

[56] References Cited

U.S. PATENT DOCUMENTS 2,902,948  9/1959  Fowler et al. .................... 99/450.4

FOREIGN PATENT DOCUMENTS

| 21752 | 7/1957 | German Democratic Rep. ... 74/401 |
| 567502 | 2/1945 | United Kingdom . |
| 736249 | 9/1955 | United Kingdom . |
| 999944 | 7/1965 | United Kingdom . |
| 1207863 | 10/1970 | United Kingdom . |
| 1267422 | 3/1972 | United Kingdom . |
| 1322064 | 7/1973 | United Kingdom . |
| 1470645 | 4/1977 | United Kingdom . |
| 2064063 | 6/1981 | United Kingdom . |

Primary Examiner—Joseph E. Valenza
Assistant Examiner—Kyle E. Shane
Attorney, Agent, or Firm—Richard Kornutik

[57] ABSTRACT

Phase controlled apparatus for a processing operation including an article conveyor, processing means driven by the conveyor for operating upon the articles being conveyed, and a phase control device operatively interposed between said conveyor and said operating means for adjusting the alignment of the operating means and the articles being conveyed.

22 Claims, 4 Drawing Figures

4,597,488

PHASE CONTROLLED APPARATUS FOR A PROCESSING OPERATION

BACKGROUND OF THE INVENTION

The present invention relates to apparatus for processing articles, and, more particularly, to such apparatus including provision for phase control to align the instrumentality operating on the articles and the articles being operated upon.

In the manufacture of creme sandwich cookies, one method of depositing the creme filling onto the lower base cake uses a base cake conveyor having a curved section forming a half circle and a turret depositor positioned over this curved section of the conveyor. This type of turret depositor, shown in U.S. Pat. No. 3,227,320, has multiple extrusion nozzles. As the turret rotates, each of the nozzles, in turn, moves over the base cake entering the curved section of the conveyor and tracks that base cake in its movement through the curve. During this motion a quantity of creme filling is extruded from the nozzle onto the base cake.

To synchronize the movement of the turret and that of the conveyor, the turret is driven by the conveyor. The turret is clamped to a shaft driven by the conveyor. The position of the nozzles with respect to the base cakes is adjusted by stopping the machinery, unclamping the turret, rotating the turret an amount estimated to provide synchronism, reclamping the turret and restarting the machinery. Frequently further adjustments are necessary and the cycle must be repeated several times.

This adjustment operation is time consuming and the base cakes flowing from the baking oven during these shutdown periods must be either dumped or collected and manually fed back onto the conveyor at the end of a production run.

The location of the icing deposits on the base cakes is influenced by a number of factors including the viscosity of the icing, the dimensions of the base cakes, wear in the conveyor and turret drive components, and the tension of the icing cut off wire. Whenever a change in any of these factors occurs, it may be necessary to realign the turret with a resulting loss of production time and product.

The difficulty of making adjustments also encourages the production of inferior product. When a misalignment occurs, the degree of deterioration of the product quality must always be weighed against the loss of time and production which will be sacrificed to restore the quality. Since small adjustments cannot be made without loss of production, there is a tendency to let the quality deteriorate until it can not longer be tolerated.

SUMMARY OF THE INVENTION

It is the object of the present invention to provide apparatus for an article processing operation in which the phase relation between the operating instrumentaility and the articles operated upon can be adjusted while the apparatus is in use.

The object of the present invention is accomplished by providing phase controlled apparatus for a processing operation comprising an article conveyor, an article processing device driven by the conveyor, and a phase control device operatively interposed between the conveyor and the processing device including a rotary input member driven by the conveyor, a rotary output member driving the processing device, and an adjustable gearing assembly for controlling the relative rotational position of the rotary input and output members to align the processing device with the articles being processed.

BRIEF DESCRIPTION OF THE DRAWINGS

A preferred embodiment of the invention has been chosen for purposes of illustration and description, and is shown in the accompanying drawings, forming a part of the specification, wherein:

FIG. 4 is a sectional view taken along line 4—4 on FIG. 1.

DESCRIPTION OF THE PREFERRED EMBODIMENT

Figure 1:
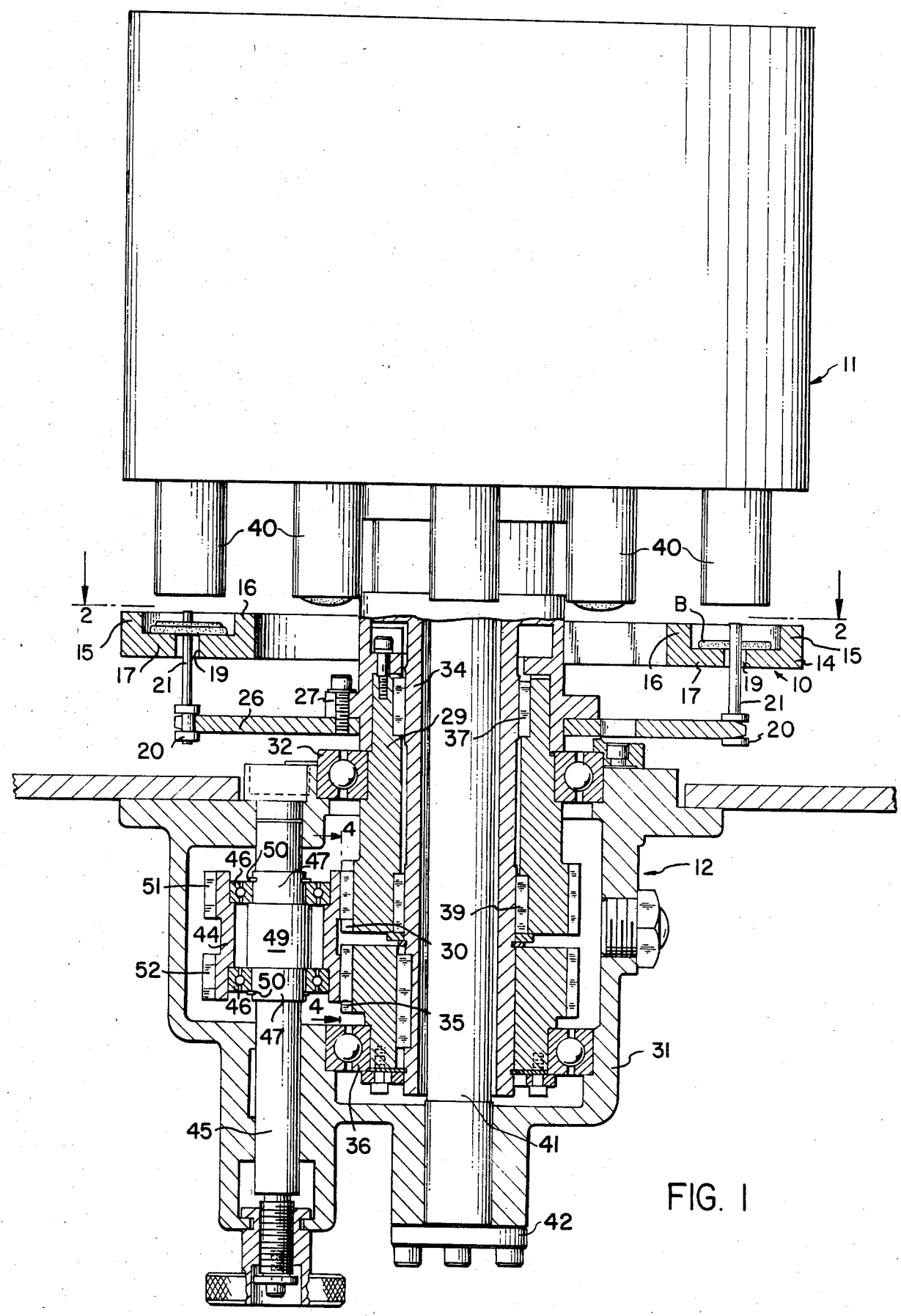
FIG. 1 is an elevational view, partly in section, of apparatus according to the present invention.

Referring to the drawings in detail, there is shown apparatus according to the present invention which comprises a pin type conveyor 10, a depositing turret 11 driven by the conveyor 10, and a phase control arrangement 12 operatively interposed between the conveyor 10 and the turret 11.

Figure 2:
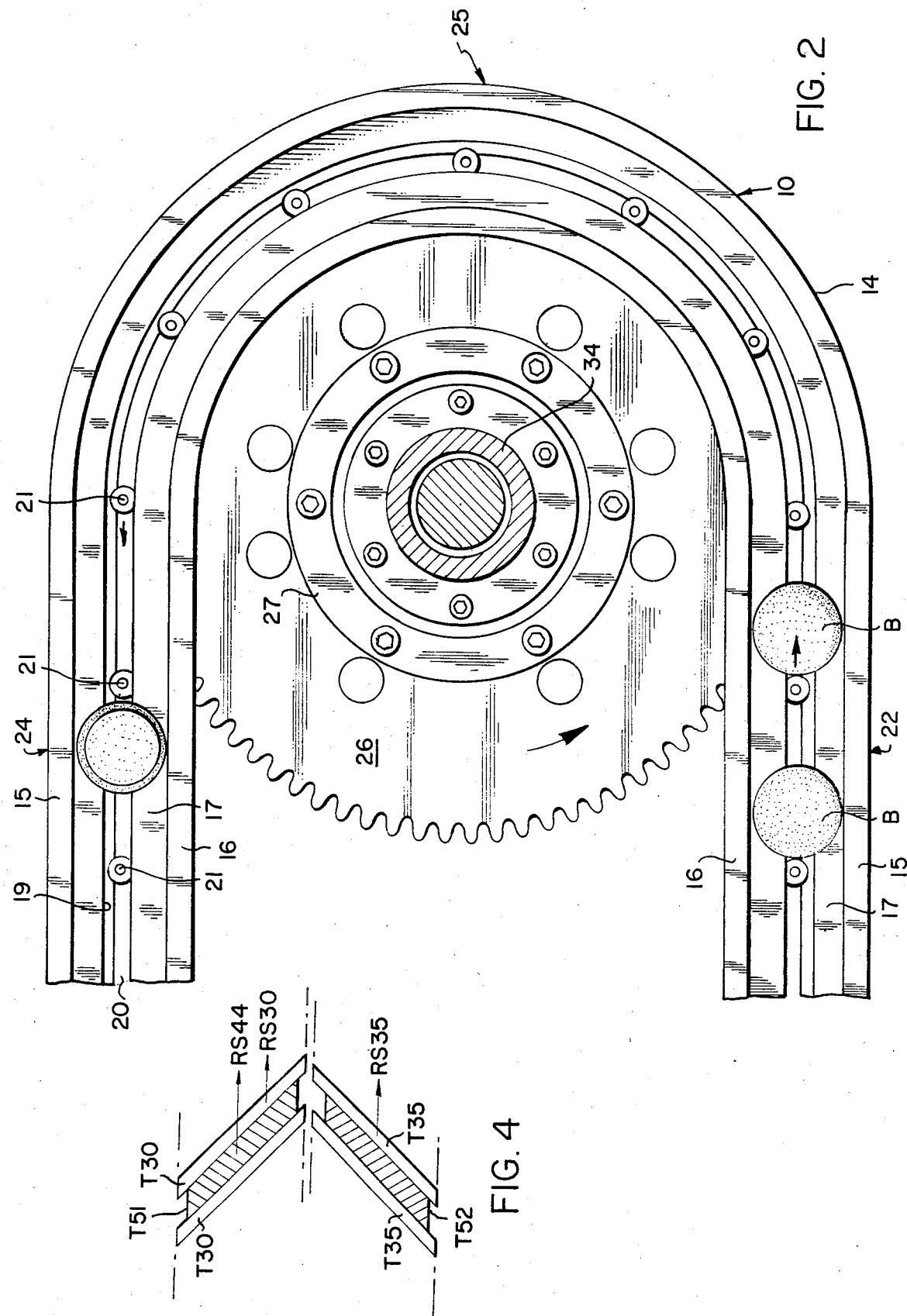
FIG. 2 is a plan view taken along line 2—2 on FIG. 1.

The conveyor 10 includes a track 14 formed with sidewalls 15, 16 and a bottom wall 17. The bottom wall 17 is provided with a central slot 19. A conveyor chain 20 is positioned beneath the track 14 and a plurality of pins 21, carried by the chain 20, extend vertically through the slot 19. As shown in FIG. 2, the conveyor 10 includes a straight input section 22, a straight output section 24, and a semi circular section 25 connecting sections 22 and 24. A sprocket wheel 26 guides the chain 20 around a semi circle beneath the section 25. The wheel 26 is bolted to a hub 27 which in turn is bolted to a sleeve 29 provided with a helical gear 30 at its lower end. The sleeve 29 is journalled at the top of casing 31 in a bearing 32.

The turret 11 is mounted on a sleeve 34 which extends downwardly through the sleeve 29. A helical gear 35 is mounted on, and keyed to, the lower end of the sleeve 34. The sleeve 34 is journalled at the bottom of the casing 31 in a bearing 36. A pair of bearings 37, 39 are fitted into the inner wall of the sleeve 29 and engage the outer wall of the sleeve 34.

The turret is filled with icing which is dispensed through a plurality of nozzles 40. The weight of the turret is supported by a vertical shaft 41 which rides on an end plate 42 bolted to the casing 31.

The driving connection between the sleeve 29 (coupled to the conveyor 10) and the sleeve 34 (coupled to the turret 11) is provided by a gear member 44 carried by a shaft 45 that is parallel to the sleeves 29 and 34. The gear member 44 is annular and is mounted on the shaft 45 by means of a pair of bearings 46. The shaft 45 is formed with annular shoulders 47 on each side of an enlarged section 49. The bearings 46 are mounted on the shoulders 47 and held against axial motion by clips 50. The gear member 44 is formed with helical gears 51 and 52 at each end which mesh with the gears 30 and 35 respectively.

Figure 3:
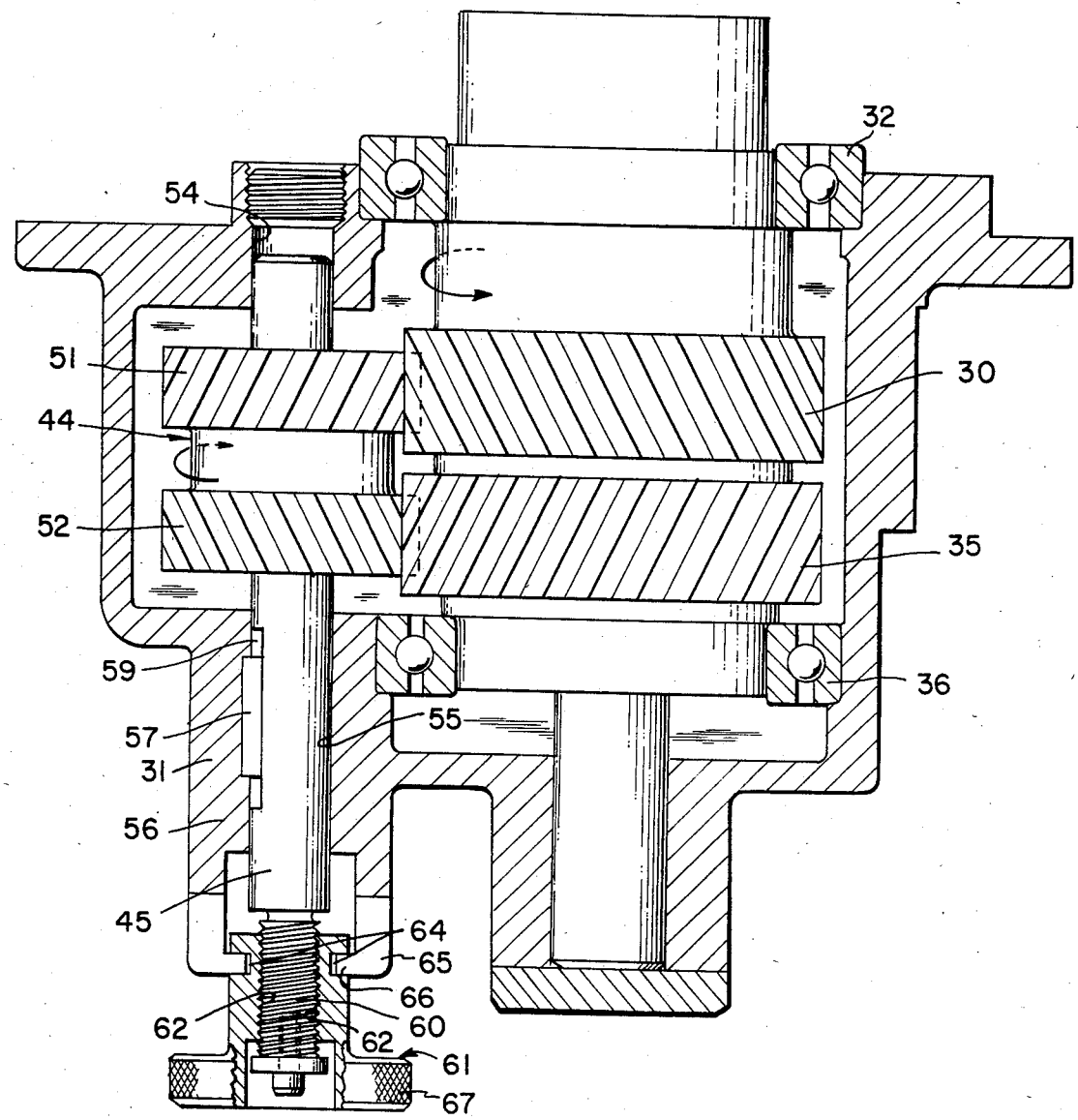
FIG. 3 is an elevational view similar to FIG. 1 illustrating the angle of the various helical gears.

As shown in FIG. 3, the teeth on gears 30 and 35 are angled in opposite directions, the gear 30 having a left hand helix angle and the gear 35 having a right hand helix angle. In like manner, as seen in FIG. 3, the gear 51 has a right hand helix angle and the gear 52 has a left hand helix angle.

The shaft 45 is mounted within the casing for axial movement. The upper end of the shaft 45 extends into a bore 54 in the upper wall of the casing 31 while the lower end of the shaft extends through a bore 55 in a formation 56 extending downwardly from the casing 31. A key member 57 is positioned in the formation 56 to extend into a key way slot 59 provided in the lower portion of the shaft 45. The slot 59 is considerably longer than the key 57 to allow for axial movement of the shaft 45 while preventing rotary movement thereof.

The shaft 45 is provided with a threaded end section 60 of reduced diameter. An adjusting nut 61 having an internally threaded bore 62 is threaded onto the shaft section 60. The nut 61 is provided with an annular groove 64 and is held captive against axial translation by fingers 65 that extend downwardly from the formation 56 and have tips 66 seated in the groove 64. A knurled knob 67 is provided on the nut 61 for easy manual manipulation.

In operation, the conveyor chain 20 is driven in the direction shown in FIG. 2 by a sprocket wheel that is not shown. The pins 21 carried by the chain 20 move the base cakes B along the conveyor through the infeed section 22, around the curved section 25 and into the output section 24. The chain 20 drives the sprocket wheel 26, turning the gear 30, the gear member 44, and the gear 35. The turret 11 rotates with the gear 35 to move the nozzles 40 in synchronization with the base cakes carried by the conveyor 10. As each nozzle 40 tracks a base cake around the curved section 25 of the conveyor, a quantity of icing is extruded from the nozzle. As the nozzle approaches the end of the curved section 25, it moves past a taut wire (not shown) positioned to cut off the extruded icing material allowing it to fall onto the base cake.

When the location of the icing deposits on the base cake begins to change (as a result of wear in the drive components, or changes in the icing viscosity or the tension in the cutoff wire, etc.), the phase control arrangement 12 is used to reposition the turret 11 with respect to the conveyor 10.

If the icing deposit moves toward the leading edge of the base cakes, the adjusting nut 61 is turned to move the shaft 45 upwardly. The gear member 44 moves upwardly with the shaft 45, moving the gears 51 and 52 axially with respect to the gears 30 and 35.

Referring to FIG. 4, in order for the gear member 44 to move upwardly, the tooth T51 of the gear 51 must slide along the groove between the teeth T30 of the gear 30. To accomplish this, there must be a change in the amount that the gear 51 rotates with respect to the gear 30 as the upward movement takes place. The gear 30 is the driving gear, therefore, the gear 51 experiences the rotational change. As shown in FIG. 4, the tooth T51 must move to the left with respect to the teeth T30 as the tooth T51 moves upwardly. This "leftward" movement produces a change in the speed of rotation of the gear 51 with respect to the gear 30. In FIG. 4, the rotational speed of the gear 30 is represented by the arrow RS30 and the rotational speed of the gear member 44 is represented by the arrow RS44. It can be seen that the "leftward" movement of the tooth T51 produces a decrease in the rotational speed of the gear member 44.

As the tooth T51 moves upwardly and to the left, the tooth T52 of gear 52 follows. The upward and leftward movement of the gear T52 moves the teeth T35 leftward and thereby decreases the rotational speed of the gear 35 (shown by the arrow RS36) with respect to the rotational speed of the gear 52 (RS44). Thus the decrease in the rotational speed of the gear 35 contains two components. The first component is that which results from the helix angle of the gears 30 and 51, and the second component is that which results from the helix angle of gears 51 and 35.

The decrease in the rotational speed of the gear 35 with respect to the gear 30 for the period of time during which the shaft 45 is moved axially, changes the alignment or phase of the turret with respect to the conveyor pins so as to reposition the icing deposit to center it on the base cake.

When changes in the system result in the movement of the icing deposit toward the trailing edge of the base cake, the adjusting nut 61 is rotated to move the shaft 45 downwardly. This results in a temporary increase in the rotational speed of the turret to correct the alignment of the turret and the conveyor.

It can be seen from the foregoing that the present invention provides apparatus for an article processing operation in which the phase relationship between the operating instrumentality and the articles operated upon can be adjusted while the apparatus is in use.

We claim:

1. Phase controlled apparatus for a processing operation comprising in combination an article conveyor including a curved section equidistant from a vertical axis, processing means driven by said conveyor including a turret mounted to rotate about said axis for operating upon the articles being conveyed along said curved section, said turret having multiple heads each positioned to track an article as it is carried along said curvey conveyor section, wheels means mounted for rotation about said axis and driven by said conveyor, and a phase control device operatively interposed between said conveyor and said processing means, said phase control device including a first gear mounted for rotation with said wheel, a second gear mounted to rotate with said turret, at least one of said gears being a helical gear, said first and second gears being independently journalled and having teeth angled in different directions, a gear member having a first gear element meshing with said first gear and a second gear element meshing with said second gear, said gear elements being locked against relative rotational movements, said gear member being mounted for rotation about a second axis parallel to said first mentioned axis, said turret being driven by said conveyor through said first and second gear element, and means for moving said gear member axially with respect to said first and second gears whereby the relative rotational position of first and second gears is changed resulting in a change in the alignment of the turret heads with the articles conveyed.

2. Apparatus according to claim 1, wherein said first and second gears are helical gears with teeth angled in opposite directions.

3. An apparatus for controlling the phase relationship of rotating members used in a processing operation, comprising in combination:
 a means for conveying articles;
 a first rotary member having an axis of rotation, said first rotary member being adapted to rotate at an angular velocity, said means for conveying articles having a portion thereof in engagement with said first rotary member;

a second rotary member having an axis of rotation, said second rotary member being adapted to rotate in a synchronous relationship to said means for conveying articles, said second rotary member performing a processing operation upon articles conveyed by said means for conveying articles;

and a means for transmitting power between said first and second rotary members, said means for transmitting power having a rotary axis, and being axially movable relative to said first and second rotary members;

said means for transmitting power, while not axially moving, causing said first rotary member to rotate at an angular velocity which is a predetermined ratio of the angular velocity of said second rotary member;

said means for transmitting power, while axially moving, causing an angular relative acceleration between said first rotary member and said second rotary member;

said means for transmitting power being axially movable while transmitting power;

said first rotary member having an initial synchronous relationship to said second rotary member when said means for transmitting power is in an initial axial position, and having a different synchronous relationship to said second rotary member when said means for transmitting power is in another axial position;

said means for transmitting power having a range of axial movement, with each axial position corresponding to a different synchronous relationship between said first and second rotary members;

whereby the synchronous relationship between said first and said second rotary members is adjustable by axial movement of said means for transmitting power, thereby affecting said processing operation performed by said second rotary member upon articles conveyed by said means for conveying articles.

4. An apparatus as claimed in claim 3, wherein said first rotary member has a hollow interior adapted to receive a first portion of said second rotary member therein;

said first portion of said second rotary member being rotatable relative to said hollow interior of said first rotary member;

said means for transmitting power having a first portion adapted for contacting a first portion of said first rotary member, and having a second portion for contacting a third rotary member, said third member being in engagement with said first portion of said second rotary member.

5. An apparatus as claimed in claim 4, wherein said means for transmitting power rotates about said rotary axis;

said rotary axis of said means for transmitting power being parallel to the axis of rotation of said second rotary member.

6. An apparatus as claimed in claim 5, wherein said axis of rotation of said first rotary member is colinear with said axis of rotation of said second rotary member.

7. An apparatus as claimed in claim 6, where in said means for transmitting power has a first set of gear teeth and a second set of gear teeth;

said first rotary member having a set of gear teeth in engagement with said first set of gear teeth of said means for transmitting power;

said third rotary member having a set of gear teeth in engagement with said second set of gear teeth.

8. An apparatus as claimed in claim 4, wherein said means for transmitting power has a first set of gear teeth and a second set of gear teeth;

said first rotary member having a set of gear teeth in engagement with said first set of gear teeth of said means for transmitting power;

said third rotary member having a set of gear teeth in engagement with said second set of gear teeth.

9. An apparatus as claimed in claim 8, wherein said articles are biscuits;

and said processing operation performed by said second rotary member upon said articles is deposition of a comestible substance upon said articles.

10. An apparatus as claimed in claim 9, wherein said comestible substance is icing;

said second rotary member comprising an icing depositor;

whereby icing can be deposited upon a predetermined portion of each biscuit by a suitable adjustment of the axial position of said means for transmitting power.

11. An apparatus as claimed in claim 4, wherein said first rotary member has a large gear driven by said means for conveying articles and a hollow cylindrical shaft supporting said large gear; said hollow interior being located inside said hollow cylindrical shaft;

said hollow cylindrical shaft having helically angled gear teeth adapted to drive said means for transmitting power;

said means for transmitting power having teeth adapted to engage said helically angled gear teeth of said hollow cylindrical shaft, and having another set of teeth for driving said second rotary member;

said third rotary member having helically angled teeth adapted to be driven by said another set of teeth on said means for transmitting power;

said second rotary member having a predetermined angular velocity equal to that of said first rotary member when said means for transmitting power is not being axially moved;

axial movement of said means for transmitting power causing relative rotational movement between said first and second rotary members due to the action of said teeth of said means for transmitting power upon said helically angled teeth of said first and said third rotary members.

12. An apparatus as claimed in claim 11, further comprising a means for manually adjusting the axial position of said means for transmitting power.

13. An apparatus for depositing material upon moving articles, comprising in combination:

a means for conveying articles;

a first rotary member having a toothed gear driven about an axis by said means for conveying articles;

said first rotary member having a hollow cylindrical shaft fixedly connected to said toothed gear, said hollow cylindrical shaft having a concentrically-disposed ring of helical gear teeth;

a second rotatable member having a support shaft operating said second rotary member to deposit material upon said conveyed articles; said second rotary member having a plurality of depositing orifices disposed above said means for conveying articles;

and a means for transmitting power from said means for conveying articles to said second rotatable member;

said support shaft of said second rotatable member being rotatably disposed within said hollow cylindrical shaft of said first rotary member and having a third rotary member having helical teeth disposed beneath a lower-most extent of said hollow cylindrical shaft;

said means for transmitting power including a shaft having two sets of helical teeth;

each of said sets of helical teeth on said means for transmitting power being located so as to be in mating engagement with respective sets of teeth on said first and said third rotary members;

said means for transmitting power being rotatably supported by a support member; said support member being non-rotatably supported; said support member being axially movable relative to said support member;

and a means for positioning the axial location of said means for transmitting power, said means for positioning maintaining an axial position of said means for transmitting power when not being actuated;

whereby actuation of said means for positioning causes axial movement of said means for transmitting power, which in turn causes relative rotational displacement between said first and second rotary members during power transmission, in turn synchronizing deposition of material from said second rotary member upon articles conveyed by said means for conveying articles; whereby each article conveyed received deposited material upon a predetermined location thereof; and whereby deviations from deposition upon predetermined locations can be rectified by adjustment of said means for positioning without stoppage of said means for conveying.

14. An apparatus as claimed in claim 13, wherein said articles have an upper surface, and wherein said material is extrudable;

said first and second rotary members being synchronized to deposit said material from said second rotary member entirely upon said articles.

15. An apparatus as claimed in claim 13, wherein said material is icing, said second rotary member depositing said icing in pieces, one piece being deposited upon each said article conveyed by said means for conveying;

said first and second rotary members being synchronizable without stopping of said means for conveying to deposit each piece such that such piece is approximately centered upon each respective said article.

16. An apparatus as claimed in claim 15, wherein each said article is disc-shaped.

17. A synchronizing mechanism for controlling a phase relationship of two synchronized rotating members, comprising in combination:

a conveyor moving at a predetermined speed, said conveyor moving articles in spaced relationship through at least an arcuate path;

said arctuate path directly underlying a rotary material dispensing member;

said rotary dispensing member being adapted to rotate at a constant angular velocity equal to the angular velocity of said conveyor as it travels through said arctuate path;

another rotary member being driven by said conveyor;

a means for synchronizing said rotary dispensing member and said another rotary member, said means for synchronizing including an axially movable rotatable member having a first set of helical gear teeth contacting a set of helical gear teeth fixedly connected to said another rotary member; said means for synchronizing being rotatable about an axis; said means for synchronizing having a second set of helical gear teeth contacting a set of helical gear teeth fixedly connected to said rotary dispensing member;

said rotary dispensing member having a central support shaft rotating about a central axis and having said second set of helical gear teeth connected thereto;

said another rotary member being coaxially disposed about said central support shaft and being adapted for relative rotation to said central support shaft;

a means for axially positioning said means for synchronizing;

said axis of said means for synchronizing being parallel to said central axis of said rotary dispensing member;

whereby said rotary dispensing member is synchronizable with said articles moved by said conveyor by axially positioning of said means for synchronizing.

18. A synchronizing mechanism as claimed in claim 17, wherein said means for synchronizing transmits power from said conveyor to said rotary dispensing member.

19. A synchronizing mechanism as claimed in claim 18, wherein said means for synchronizing has a non-rotatable central body member being linearly movable along said axis of said means for synchronizing; said first and second sets of teeth being carried by a single rotatable member which is supported rotatably by at least a bearing member fixed to said central body member.

20. A synchronizing mechanism as claimed in claim 19, wherein said central body member has a threaded end;

and said means for axially positioning including a rotatable internally threaded nut fixed against axial and translational movement; said nut receiving said threaded end in threaded engagement such that rotation of said nut causes axial movement of said central body member;

whereby rotation of said nut can synchronize and alter the pase relationship of said rotary dispensing member to the arcuate movement of said articles without stopping of said conveyor.

21. A synchronizing mechanism as claimed in claim 20, wherein said articles have an upper surface, and wherein said material is extrudable;

said first and second rotary members being synchronized to deposit said material from said second rotary member entirely upon said articles.

22. A synchronizing mechanism as claimed in claim 21, wherein each said article is disc-shaped.

* * * * *